United States Patent [19]

Rouverol

[11] 4,259,875
[45] Apr. 7, 1981

[54] HIGH-TORQUE LOW-NOISE GEARING

[76] Inventor: William S. Rouverol, P.O. Box 9122, Berkeley, Calif. 94709

[21] Appl. No.: 931,855

[22] Filed: Aug. 7, 1978

[51] Int. Cl.³ .............................................. F16H 55/08
[52] U.S. Cl. ....................................................... 74/462
[58] Field of Search .................. 74/462, 457, 443, 460

[56] References Cited

U.S. PATENT DOCUMENTS

| | | | |
|---|---|---|---|
| 1,453,395 | 5/1923 | Labberton | 74/462 |
| 1,647,191 | 11/1927 | Norton | 74/462 |
| 3,824,873 | 7/1974 | Rouverol | 74/462 |
| 3,881,364 | 5/1975 | Rouverol | 74/462 |
| 3,918,315 | 11/1975 | Rouverol | 74/462 |
| 3,937,098 | 2/1976 | Rouverol | 74/462 |
| 3,946,621 | 3/1976 | Rouverol | 74/462 |
| 4,108,017 | 8/1978 | Rouverol | 74/462 |

OTHER PUBLICATIONS

"Gear Handbook," First Edition, Darle W. Dudley, (Edit.), Chapter 5, Sections 5-1 through 5-13.

Design Data Sheet, Nov. 13, 1958, Machine Design Catalog, (Author-C. Tiplitz), p. 161.

*Primary Examiner*—C. J. Husar
*Assistant Examiner*—Conrad Berman

[57] ABSTRACT

Gear tooth profiles are disclosed that afford a higher torque capacity than that of previously disclosed fine-pitch gearing. To offset the weakness in bending of fine teeth, the transmitted force is divided among two to five times as many teeth as in conventional gearing, by using very low pressure angles, and the tooth interference that would occur between meshed involute teeth of equally small pressure angle is avoided by using profiles of shorter relative radius of curvature. The tooth flexibility needed to offset tooth separation at the ends of the line of action and to insure an equitable division of the load among the maximum number of teeth is obtained by deepening the dedenda. The resulting tooth form increases torque capacity by maximizing the transverse contact ratio and minimizes operating noise by increasing the axial contact ratio.

23 Claims, 2 Drawing Figures

HIGH-TORQUE LOW-NOISE GEARING

Conventional forms of fine-pitch gearing have a limited torque capacity because tooth root stresses increase almost linearly with diametral pitch (i.e., inversely with tooth module), as is evident from the well-known "Lewis Equation". The object of the present invention is therefore to devise a tooth form that does not lead to a loss of torque capacity as the teeth are made finer, so that high capacity gearing can benefit from the very low noise levels associated with fine teeth.

The means to achieve this and other objects and advantages of the invention will be evident from the drawing as explained in the specification that follows.

Figure 1:
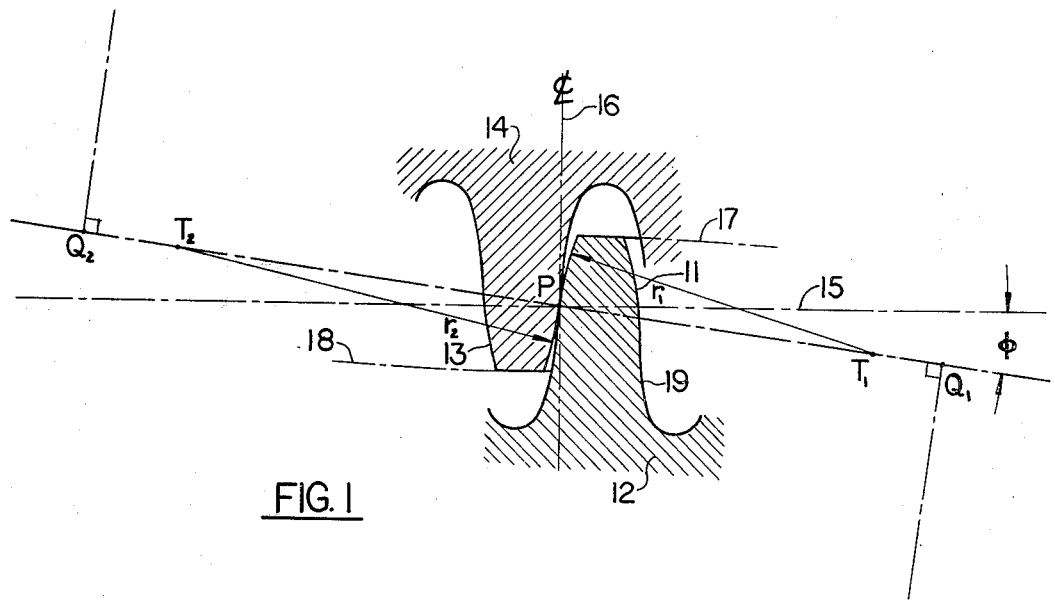
FIG. 1 is a partial section of a pair of mating helical gears taken perpendicularly to the common pitch element (i.e., "transversely") and showing mating profiles embodying the invention.

In detail, and referring to FIG. 1, typical teeth 11, 13 embodying the invention are shown in transverse section engaged at pitch point P. Tooth 11, at right, is on the smaller gear 12 (pinion) and has a working profile of circular arc form, the radius of the arc being $r_1$ and the arc center being at $T_1$. Similarly, tooth 13 is on the larger gear 14 and has a circular arc working profile of radius $r_2$ centered at $T_2$. The line $Q_1Q_2$ is the pressure line making an angle $\phi$, The transverse pressure angle, with a line 15 normal to the line of centers 16 at the pitch point P. The points $Q_1$ and $Q_2$ are the points where the pressure line $Q_1Q_2$ is tangent to the base circles (not shown) from which involute profiles would have been generated. Portions of the addendum circles 17, 18 for the pinion 12 and gear 14 are also shown. (Other parts of the pinion 12 and gear 14, such as hubs, webs, rims, keyways, etc., are standard and are omitted in the interest of clarity.)

Figure 2:
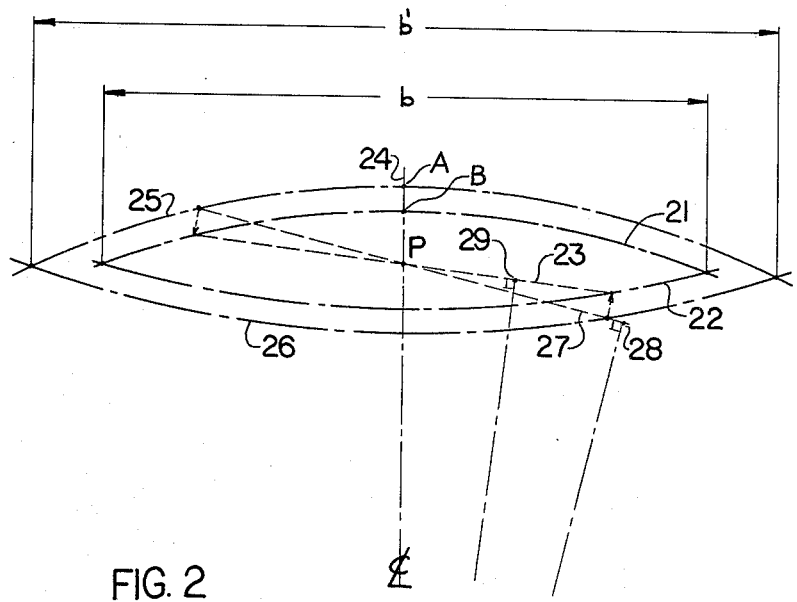
FIG. 2 is a diagram of the transverse plane area bounded by the addendum circles of a set of gears similar to those of FIG. 1 and the corresponding area for an involute gear of the same size, showing how the length of the path of contact of the involute gear can be maintained with finer teeth if the pressure angle is reduced and interference is avoided.

In the embodiment illustrated in FIG. 1, the pressure angle $\phi$ is approximately 7-½°. The purpose of having such a small pressure angle, which is about as small as can be employed on a "constant-profile" (i.e., sharpenable) hob, is to make the path of contact as long as possible. This effect is illustrated in FIG. 2, which shows addendum circles 21, 22 (analogous to circles 17, 18 in FIG. 1) for another gear set embodying the invention. The path of contact 23 passes through the pitch point P and extends from one addendum circle 21 to the other 22. For reasons explained in several prior art patents (e.g., U.S. Pat. No. 3,881,364 and U.S. Pat. No. 4,108,017, the path of contact 23, or "line of action" in this case, makes a smaller angle with a normal to the line of centers 24 than the pressure line does.

It will be evident that the length of the path of contact 23 is a very substantial part of the length b of the area bounded by the addendum circles 21, 22. This area is called the "potential tooth contact zone" because it is the only area in which tooth contact can occur, and in the example illustrated in FIG. 2, the path of contact 23 is more than 70% as long as the overall zone length b.

For purposes of comparison, FIG. 2 also shows the "potential tooth contact zone" for a set of 14-½° involute gears of the same pitch diameters. The involute teeth (not shown) have a larger tooth module, so the addendum circles 25, 26 that bound the potential tooth contact zone are outside those for the gear set embodying the invention. As a result, the potential tooth contact zone has a greater length b′, and the length of the involute path of contact 27, which in this case is the same length as path of contact 23, is therefore a considerably smaller portion of the zone length b′. Typically, the path of contact for involute and cycloidal gears is between 30 and 55% of the zone length, being smaller for larger tooth numbers and larger pressure angles (20° and 25°). This constitutes an underutilization of the potential tooth contact zone, and it is an object of the invention to increase the utilization factor to the range from 60 to 80%.

A diagram such as that of FIG. 2 has another use, which is to reveal how much the tooth module of a set of gears embodying the invention can be reduced relative to that of a given involute set without seriously reducing the path of contact length 23 and thereby diminishing the torque capacity. For example, the gear set having the inner zone bounded by addendum circles 21, 22 has a tooth module that is about half that of the involute set. If this module were cut in half again, the zone length b would be reduced to 70.7% of the length shown, and this would be slightly shorter than the length of path of contact 23. Consequently, even if the slope of path of contact 23 were reduced to zero (which it cannot be), the path of contact 23 would have to be shorter than the involute path of contact 27, and the torque capacity would be reduced almost in proportion.

Although the ratio of path of contact length to zone length is a useful criterion of potential torque capacity, a more direct measure is one that considers the transverse contact ratio since this is specifically involved in stress calculations. However, most gear designs embodying the invention have, as noted above, a path of contact slope that is smaller than the pressure angle. There is in this case no "base circle", properly speaking, so the base pitch that is divided into the path of contact length to calculate the transverse contact ratio for involute gears is not appropriate. To avoid confusion, the measure of path of contact length used in this specification and the ensuing claims will therefore be the tooth module.

Referring to FIG. 2, if the involute gear has a standard addendum height of one tooth module, this appears in the figure as the distance P—A, and the length of the path of contact 27 then scales to a length of about 5.7 modules, which corresponds to a transverse contact ratio of about 1.8. In the case of the inner tooth contact zone, for the gear set embodying the invention, a slightly larger addendum coefficient of 1.2 is used, for reasons noted below. The number of teeth is larger, however, so the module is about half that of the distance P—A, being equal approximately to the distance P—B divided by 1.2. If this smaller module is stepped off on the path of contact 23 with the aid of a pair of dividers, it will be found that the path of contact 23 has a length of about 9.5 modules.

To put the question of path of contact length into perspective, it is useful to consider the prior art co-planar axis gearing that has the longest path of contact. This is a type of gearing called "High-Contact-Ratio" ("HRC") gearing, which is described in a research article entitled "A Parametric Analysis of High-Contact-Ratio Spur Gears" by H. E. Staph (Transactions of the American Society of Lubrication Engineers, Vol. 19, 3, pp. 201-215). The largest contact ratio proposed in this article is 2.38, which is much larger than the usual transverse contact ratios of 1.3 to 1.6 employed in conventional involute gearing.

As is well-known, the tooth contact path length of a set of co-planar axis gears is equal to the transverse contact ratio times the transverse base pitch. Since the transverse base pitch of the Type M gears described in this research article is 0.291 inches, the path of contact length is 0.693 inches (17.59mm). Since the tooth module (reciprocal of the diametral pitch, in millimeters) for the gear set in question is 2.54mm, the path length is 17.59/2.54, or 6.925 tooth modules.

As the longest path of contact lengths used in prior art co-planar axis gearing appear to be about 7 tooth modules, the domain of the invention is considered to be gear sets in which the path of contact length is at least 8 tooth modules, with lengths of 10 or 12 modules being strongly recommended. These longer lengths may be obtained partly by an increased addendum height, but are primarily the result of a considerably reduced pressure angle. Although pressure angles in the vicinity of 10° are advantageous, the most desirable are those of 8° or less.

In addition to the low pressure angle and the lengthened path of contact, a number of other features may be advantageous to use separately or in combination in gears embodying the invention. These include:

(1) Because of troichoidal cutting action on the flanks of pinions with small numbers of teeth, the main advantages of the invention are realized in gear slots where the pinion has more than 24 teeth, and preferably, more than 36. (See "Analytical Mechanics of Gears", by Earle Buckingham, Dover, 1963, pp. 48-51).

(2) Tooth profile curves that afford a relative radius of curvature at the pitch point that is at most 80 or 90% of that of involute gears of the same size and pressure angle are usually desirable. Referring to FIG. 1, since both $r_1$ and $r_2$ are smaller than the involute profile radii $Q_1P$ and $Q_2P_1$, the relative radius of curvature will be shorter than that of involute profiles. The advantage of this is that it helps avoid intereference and undercutting of the pinion, improves the tooth form factor by reducing the load on the tooth tip, and lengthens the path of contact.

(3) Deepened dedenda may be used to increase tooth flexibility. The purpose of this is to insure that the reduced relative radius of curvature does not produce profile separation at the ends of the line of action at the design load, and to reduce inequalities in load distribution that result from shaft misalignment and lead angle error. An incidental advantage of these deepened dedenda is that they allow a long-radius concave profile segment (19 in FIG. 1) to be interposed between the working surface and the tooth root fillet. The radius of this segment is usually at least two tooth modules, which helps to minimize the tooth root stress concentration factor and thereby increase the torque capacity.

(4) The use of circular arc profiles in the transverse plane ($r_1$ and $r_2$ in FIG. 1) has the advantage of affording an almost constant relative radius of curvature throughout the meshing action, or a completely constant one if the profiles are circular arcs in the normal plane. This greatly simplifies calculation of both surface and root stresses. But most importantly, the circular arcs are not subject to the interference and undercutting that limit the utility of involute profiles with low pressure angles. Referring to FIG. 2, the involute interference point 28 must lie outside the potential tooth contact zone if undercutting is to be avoided. The analogous point 29 for the gear set embodying the invention may lie well inside the tooth contact zone without causing interference or undercutting. In the case illustrated, it is considerably closer to the center of the gear (not shown) than is the addendum circle 22 for the gear.

(5) Because the transverse contact ratios produced by the low pressure angle and the reduced radii of curvature are so large (typically 3 to 6), the system is applicable to spur and straight level gears. A spiral or helix angle increases the axial contact ratio, however, and this significantly reduces operating noise.

(6) Increasing the addendum height of the teeth increases the length of the contact path more than it increases the tooth root bending stress and therefore affords a netincrease in torque capacity. Nominal addendum heights of about 1.2 tooth modules are therefore recommended. Taken together with the deepened dedenda, this usually produces a tooth whole depth for at least one of the mating pair that is greater than 2.5 tooth modules, and often more than 3 tooth modules.

(7) For some gear sets the designer may wish to strengthen the pinion tooth. The best way to do this is to increase the curvature of the gear tooth 13 by shortening $r_2$ (FIG. 1), and to compensate for this modification by lengthening $r_1$ to equal or exceed the involute pitch circle radius $PQ_1$. This improves the pinion form factor.

(8) The relative amounts of approach and recess action may be adjusted to suit the needs of a particular application by using unequal addendum heights. If unequal approach and recess paths are used in a gear set with reduced relative radius of curvature as proposed in (2) above, it is advantageus to make the pressure angles of the mating teeth differ by a few minutes of arc, in order to position the elliptical contact area so its center coincides with the mid-point of the contact path.

A number of other considerations relating to the gearing system herein disclosed should be noted: (a) The dedendum depths are not arbitrary but must be carefully calculated to produce the amount of tooth flexibility that is needed to overcome the slight profile separation that results from the shortened radii of curvature (as explained in U.S. Pat. No. 3,824,873). In most designs the depth should be suffiicient to cause the teeth to just make contact at the ends of the path of contact when the tooth root tensile stress reaches the endurance limit for the material of the teeth of the weaker of the gear pair. In a few designs, however, for applications where the peak torque is not much greater than the continuous service torque, the critical condition is considered to occur when the compressive root stress reaches the yield point stress of the material of the teeth of the weaker of the gear pair.

(b) As the position of point 29 in FIG. 2, shows, only a small amount of the dedendum is used as working surface. Nearly all of the working surface is on the addendum and is uninflected. Inflected working surfaces may be used, however, as in cycloidal or composite-cycloidal gears with large tooth generating circles (i.e., the major "generating circles" as defined in U.S. Pat. No. 3,946,621) if the application is one in which considerably increased sensitivity to center-distance errors is acceptable.

(c) The gearing system herein disclosed is applicable to internally meshing gear sets, as well as externally meshing ones.

(d) If the gear ratio is large, the gear may not have the interference problems the pinion does and may, therefore, be given an involute working profile. In this case, however, care must be taken to insure that the pinion flank is relieved (i.e., undercut) enough to avoid interference.

(e) Hobs for the gears disclosed in this specification are readily designed by following well-kown "roll-out" (or "network layout") procedures.

(f) Profile curves that only approximate circular arcs may be used instead of circular arcs, providing the relative radius of curvature is small enough to avoid interference.

(g) In the foregoing specification and ensuing claims the following terms have the following definitions: "transverse" means normal to the common pitch element of a pair of mating gears; in the case of bevel gears, all transverse surfaces are conical; "pressure angle" means the angle between the common tangent plane and a line normal to the tooth profiles at the pitch point; the "central axis" of a planet gear in an epicyclic gear set is the axis of polar symmetry of the planet gear itself; "line of action" is a line lying in a the transverse surface that connects the extreme ends of the path of contact; it is a straight line even if the path of contact is curved or inflected, except that in the case of a bevel gear, it is a straight line in the developed transverse surface; the "maximum line of action" is the line of action connecting the longest path of contact that can occur with any conditions of tooth loading that do not produce structural damage to the tooth materials of either member of a gear set; "average slope" means the angle between the maximum line of action and a plane tangent to the pitch surfaces of a set of mating gears at the pitch point.

I claim:

1. A pair of mating gears having central axes lying in a common plane,
   teeth formed on said gears to have conjugate profiles that make contact along a path of contact having an average slope of less than 14°,
   said gear shaving a maximum line of action in the transverse direction longer than eight tooth modules.

2. A pair of mating gears according to claim 1 wherein both of said pair have more than 24 teeth.

3. A pair of mating gears according to claim 1 wherein both of said pair have more than 36 teeth.

4. A pair of mating gears according to claim 1 wherein the relative radius of curvature of said teeth at the pitch radius is less than that of involute gears of the same size and pressure angle.

5. A pair of mating gears according to claim 1 wherein the relative radius of curvature of said teeth at the pitch radius is less than 90% of that of involute gears of the same size and pressure angle.

6. A pair of mating gears according to claim 1 wherein the relative radius of curvature of said teeth at the pitch radius is less than 80% of that of involute gears of the same size and pressure angle.

7. A pair of mating gears according to claim 1 wherein the total height of the teeth of one of said pair is greater than 2.5 tooth modules.

8. A pair of mating gears according to claim 1 wherein the total height of the teeth of one of said pair isgreater than 3 tooth modules.

9. A pair of mating gears according to claim 1 wherein said slope is less than 10°.

10. A pair of mating gears according to claim 1 wherein said slope is less than 8°.

11. A pair of mating gears according to claim 1 wherein said teeth are slantingly disposed with respect to the common pitch element of said pair.

12. A pair of mating gears according to claim 1 wherein the tooth profiles of one of said pair are circular arcs in the normal plane.

13. A pair of mating gears according to claim 1 wherein the tooth profiles of one of said pair are circular arcs in the transverse plane.

14. A pair of mating gears according to claim 1 wherein the teeth of one of said pair have a concave portion between the working surface and the root fillet.

15. A pair of mating gears according to claim 14 wherein the radius of curvature of said concave portion is equal to at least 2 tooth modules.

16. A pair of mating gears according to claim 1 wherein the addendum height of the teeth on one of said pair is greater than that of the teeth of the other of said pair.

17. A pair of mating gears according to claim 1 wherein the dedendum depths of the teeth on each of said pair are sufficient to cause said teeth to just make contact at one end of said line of action when the tooth root tensile stress reaches the endurance limit for the material of the teeth of one of said pair.

18. A pair of mating gears according to claim 17 wherein the dedendum depths of the teeth on each of said pair are sufficient to cause said teeth to just make contact at one end of said line of action when the tooth root compressive stress reaches the yield point for the mterial of the teeth of one of said pair.

19. A pair of mating gears according to claim 1 wherein said line is longer than ten tooth modules.

20. A pair of mating gears according to claim 1 wherein said line is longer than twelve tooth modules.

21. A pair of mating gears according to claim 1 wherein a line perpendicular to both the axis of one of said pair and to the line of action intersects said line of action at a point closer to the axis of the other of said pair than is the addendum circle of said other of said pair.

22. A pair of mating gears according to claim 1 wherein the working profiles of the teeth of said pair are uninflected.

23. A pair of mating gears according to claim 1 wherein the addendum height of the teeth of one of said pair is greater than one tooth module.

* * * * *